United States Patent
Granzow et al.

(10) Patent No.: US 12,242,174 B2
(45) Date of Patent: Mar. 4, 2025

(54) DEVICE FOR SECURING AN OPTICAL DEVICE

(71) Applicant: Continental Automotive GmbH, Hannover (DE)

(72) Inventors: Oliver Granzow, VS-Villingen (DE); Oliver Griese, VS-Villingen (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 17/767,628

(22) PCT Filed: Oct. 9, 2020

(86) PCT No.: PCT/EP2020/078512
§ 371 (c)(1),
(2) Date: Apr. 8, 2022

(87) PCT Pub. No.: WO2021/069726
PCT Pub. Date: Apr. 15, 2021

(65) Prior Publication Data
US 2024/0103348 A1      Mar. 28, 2024

(30) Foreign Application Priority Data
Oct. 11, 2019   (DE) ..................... 10 2019 215 667.3

(51) Int. Cl.
*G03B 17/56*     (2021.01)
*B60R 11/04*     (2006.01)
*B60R 11/00*     (2006.01)

(52) U.S. Cl.
CPC ............ *G03B 17/561* (2013.01); *B60R 11/04* (2013.01); *B60R 2011/0026* (2013.01); *B60R 2011/0063* (2013.01)

(58) Field of Classification Search
None
See application file for complete search history.

(56) References Cited

U.S. PATENT DOCUMENTS

| 3,291,179 | A | 12/1966 | Lang |
| 4,536,925 | A | 8/1985 | Boothe et al. |
| 6,170,955 | B1 | 1/2001 | Campbell et al. |

(Continued)

FOREIGN PATENT DOCUMENTS

| CN | 105128761 | A | * | 12/2015 | |
| CN | 106199603 | A | * | 12/2016 | ........... G01S 13/931 |

(Continued)

OTHER PUBLICATIONS

Office Action dated Jun. 25, 2020 from corresponding German patent application No. 10 2019 215 667.3.

(Continued)

*Primary Examiner* — Rodney E Fuller

(57) ABSTRACT

A device for securing an optical device on a windshield of a vehicle is described. The device comprises a box-shaped bracket in which a holder for the optical device is mounted so as to be pivotable and fixable. It is thereby possible to set various angular positions of the holder relative to the bracket, taking into account different curvatures of the respective windshield. In this way, it is possible to use a single type of securing device to attach optical devices to windshields having different curvatures.

7 Claims, 3 Drawing Sheets

(56) References Cited

U.S. PATENT DOCUMENTS

| | | | |
|---|---|---|---|
| 9,267,761 B2* | 2/2016 | Stewart | F41G 3/00 |
| 9,487,161 B2 | 11/2016 | Rawlings et al. | |
| 10,604,082 B2 | 3/2020 | Fujiwara | |
| 10,682,965 B2 | 6/2020 | Oba et al. | |
| 10,953,817 B2 | 3/2021 | Karasik et al. | |
| 10,974,650 B2 | 4/2021 | Kremkow et al. | |
| 11,040,663 B2 | 6/2021 | DeMaagd et al. | |
| 11,237,029 B2 | 2/2022 | Kasai et al. | |
| 11,237,461 B2 | 2/2022 | Kasai et al. | |
| 11,433,827 B2 | 9/2022 | Singh et al. | |
| 11,460,754 B2 | 10/2022 | Kasai et al. | |
| 2004/0208497 A1 | 10/2004 | Seger et al. | |
| 2011/0129209 A1 | 6/2011 | Kortan et al. | |
| 2012/0169919 A1* | 7/2012 | Huertos Sanz | G03B 17/561 |
| | | | 348/373 |
| 2012/0207461 A1 | 8/2012 | Okuda | |
| 2014/0293054 A1 | 10/2014 | Tomescu | |
| 2015/0030319 A1 | 1/2015 | Matori | |
| 2017/0274835 A1 | 9/2017 | Kasai et al. | |
| 2018/0220049 A1* | 8/2018 | Yamada | H04N 23/51 |
| 2019/0337466 A1 | 11/2019 | Oba | |

FOREIGN PATENT DOCUMENTS

| | | | | |
|---|---|---|---|---|
| CN | 206287928 U | * | 6/2017 | |
| CN | 206812915 U | | 12/2017 | |
| CN | 108312979 A | | 7/2018 | |
| CN | 109151282 A | * | 1/2019 | |
| CN | 109572582 A | * | 4/2019 | B60R 11/04 |
| CN | 209112076 U | | 7/2019 | |
| CN | 110077333 A | * | 8/2019 | |
| CN | 209505632 U | | 10/2019 | |
| CN | 214084098 U | | 8/2021 | |
| DE | 10162652 A1 | | 7/2003 | |
| DE | 102004042217 A1 | | 3/2006 | |
| DE | 102011116388 A1 | | 4/2013 | |
| DE | 102011118121 A1 | | 5/2013 | |
| DE | 112017006142 T5 | | 8/2019 | |
| DE | 102018005317 A1 | | 1/2020 | |
| DE | 102019215667 B3 | | 11/2020 | |
| EP | 2952388 A1 | * | 12/2015 | B60R 11/04 |
| KR | 100661051 B1 | | 12/2006 | |
| KR | 20190138385 A | * | 12/2019 | |
| WO | WO-2015088396 A1 | * | 6/2015 | B60R 11/04 |
| WO | 2021112636 A1 | | 6/2021 | |

OTHER PUBLICATIONS

International Search Report and Written Opinion dated Nov. 11, 2020 from corresponding International patent application No. PCT/EP2020/078512.

Office Action dated Aug. 31, 2022 from related German patent application No. 10 2021 213 638.8.

Extended European Search Report mailed Apr. 20, 2023 from related European patent application No. 22204051.1.

Non-Final Office Action mailed Dec. 9, 2024 from related U.S. Appl. No. 18/073,116.

* cited by examiner

DEVICE FOR SECURING AN OPTICAL DEVICE

CROSS REFERENCE TO RELATED APPLICATIONS

This U.S. patent application claims the benefit of PCT patent application No. PCT/EP2020/078512 filed Oct. 9, 2020, which claims the benefit of German patent application No. 10 2019 215 667.3, filed Oct. 11, 2019, both of which are hereby incorporated by reference.

TECHNICAL FIELD

The present disclosure relates to a device for securing an optical device, in particular a camera, on the windshield of a vehicle.

BACKGROUND

Vehicles, in particular passenger cars and trucks, are available in a multiplicity of types of vehicle having differently designed windshields. The curvature of windshields of different types of vehicle differs both in the vertical and in the horizontal direction. The fixing of devices for securing an optical device to the inside of a windshield therefore causes problems, since such devices have to be adapted to the various windshields of differing curvature. Such optical devices, in particular cameras, are required, for example, for driver assistance systems such as emergency brake assistant, lane departure warning system, adaptive cruise control, traffic sign recognition, etc.

It is known to design such securing devices specifically for the various types of vehicle, i.e. for different types of vehicle a multiplicity of securing devices are required that are each adapted to the specific type of vehicle with its specifically designed windshield. Very high costs are therefore incurred for the production of such devices, since a multiplicity of variants of securing devices for different types of vehicle have to be developed. As a result, the manufacturing may become unprofitable, since only small unit quantities are produced for various types of vehicle in the commercial vehicle sector, for example. In any case, a large number of variants is required.

The aim of the present disclosure is to enable the securing and adjustment of sensors on windshields of all kinds that differ in size, curvature, and angle of inclination, and to achieve a reduction in the number of variants of the securing devices required. Specifically, the present disclosure is based on the object of providing a device of the type described at the outset, which has a particularly high level of variability and is therefore suitable for a multiplicity of types of vehicle.

SUMMARY

According to one aspect, this object is achieved by a device for securing an optical device, in particular a camera, on the windshield of a vehicle, which device comprises a box-shaped bracket with a front side which can be glued to the windshield using a liquid adhesive and has an opening for the optical device and which has an average curvature, which results from a measurement of curvatures of standard windshields, and two side surfaces adjoining the front side. The device further comprises a holder for the optical device, which holder can be inserted into the bracket and can be fixed there, and which holder is pivotably mounted on the two side surfaces of the bracket and can be fixed in different positions and which holder is provided with devices for the mounting of the optical device. The device also comprises a cover for the bracket with the holder mounted therein together with the optical device.

The present disclosure thus departs from the principle of providing a rigid securing device for each specific type of vehicle. Instead, a securing device is provided that can be adapted to various vehicles. In other words, a securing device designed according to the disclosure is suitable for various types of vehicles without modification and replacement of parts and enables the arrangement of optical devices on the windshields of these different types of vehicles.

It is essential that, when optical devices are attached to the windshield of vehicles, the optical axis of this optical device must always be aligned exactly horizontally. In order to accomplish this in a wide variety of vehicles, the securing device according to the disclosure was developed in the form of a flexible device. The device is designed in such a way that it can be installed quickly and easily by the end customer. As a result, diverse types of vehicle can be covered with a minimized number of variants.

The main part of the securing device designed according to the disclosure is a box-shaped bracket with a front side and two side surfaces adjoining the front side. The front side has an opening for the optical device. It is provided with an average curvature resulting from a measurement of curvatures of standard windshields. In this way, the box-shaped bracket is suitable for windshields of differing curvature, since the curvature of the front side of the bracket corresponds to an average curvature. Furthermore, the front side is glued to the windshield during assembly using a liquid adhesive. The use of a liquid adhesive further improves the adaptability of the front side of the bracket to the windshield, since differences in the curvature can thereby be compensated for to a certain extent.

The holder protects the optical device from stray light and thus ensures that the optical device functions without disruption. A partial region in the optical path of the bracket has to be a low-reflection region and has a special surface treatment.

The side edges of the front side of the bracket are adjoined at an angle of 90° by side surfaces which are used to secure a holder for the optical device, which holder extends from one side surface to the other side surface.

The optical axis of the optical device can be set depending on the curvature of the windshield by securing the holder to the side surfaces of the bracket. The holder is mounted pivotably on the two side surfaces of the bracket and can be fixed there in various positions. The holder can thus be connected to the side surfaces of the bracket at various angles in order to adapt the position of the optical device depending on the curvature of the windshield. As already mentioned, the optical axis must always assume a horizontal position in optical devices of this type, and therefore the holder is secured on the bracket at different angles, depending on the type of vehicle, in order to achieve the horizontal position of the optical axis. During assembly, the holder is rotated or pivoted relative to the bracket until a correct position for the optical device is reached. The holder is then fixed to the side surfaces of the bracket in order to permanently secure this position. The system consisting of bracket and holder can then be positioned on the windshield and glued thereto.

The optical device can then be secured on the associated holder and connected to the vehicle wiring harness. Finally, a cover for the bracket with the holder mounted therein together with the optical device is placed and mounted on said bracket.

The holder for the optical device has elements for elastically mounting the optical device. These may be, for example, metal springs that enable permanent and vibration-free positioning of the optical device in the holder. Furthermore, the holder can have devices for latching the optical device on the holder, and therefore the optical device can be clipped into the holder during assembly.

The cover applied to the bracket protects the optical device from mechanical damage and thus ensures disruption-free functioning of the optical device. The cover is clipped onto the bracket, such that, in the final assembled state, the cover encloses the optical device with the holder and the bracket. The bracket therefore has devices for mechanically fixing the cover.

In order to enable the holder of the optical device to be variably fixed to the side surfaces of the bracket, the side surfaces of the bracket preferably have a plurality of fixing points for side flanges of the holder for fixing same in various angular positions. The holder is therefore rotatably or pivotably arranged on both side surfaces of the bracket and has corresponding fixing points on its side flanges together with the bracket, enabling said holder to be fixed in various angular positions. These fixing points can, for example, be protruding sections on the holder or the bracket that engage in holes in the other element. Securing in various angular positions can also be undertaken using screws or other securing elements. The corresponding fixing points are arranged at intervals of 2°, for example, such that a multiplicity of closely adjacent angular positions are available for assembly.

Overall, the device designed according to the disclosure therefore enables an optical device to be adapted to a wide variety of windshields using only one variant of the device. Variants can therefore be created as late as possible in production. This achieves a significant cost reduction for small unit quantities. Furthermore, rapid availability of functional devices in new types of vehicle is achieved. A simple structure or simple assembly can be carried out, and variants can be created without special tools.

BRIEF DESCRIPTION OF THE DRAWINGS

The disclosure will become more fully understood in the detail description below with reference to the accompanying drawings, wherein.

DETAILED DESCRIPTION

Figure 1:
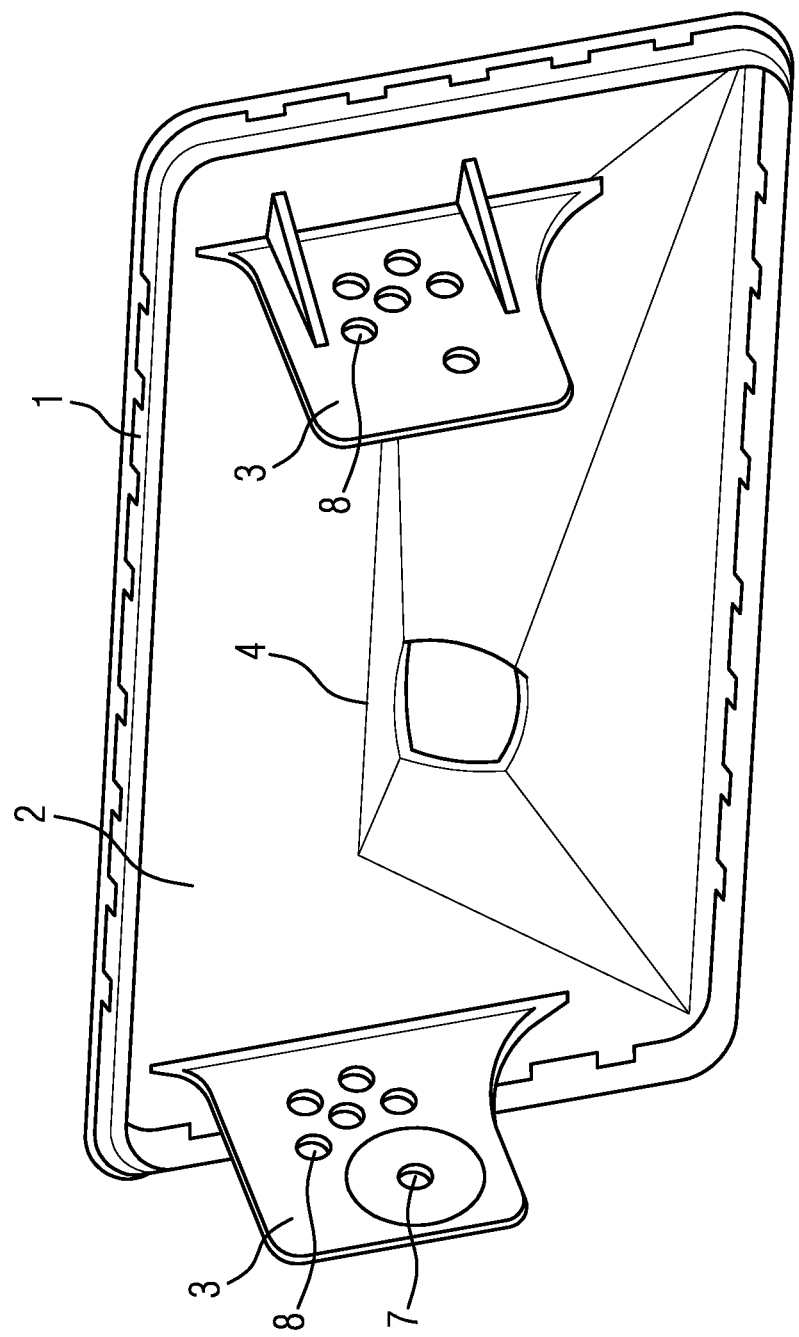
FIG. 1 shows a schematized three-dimensional illustration of a box-shaped bracket of a securing device for an optical device.
Figure 2:
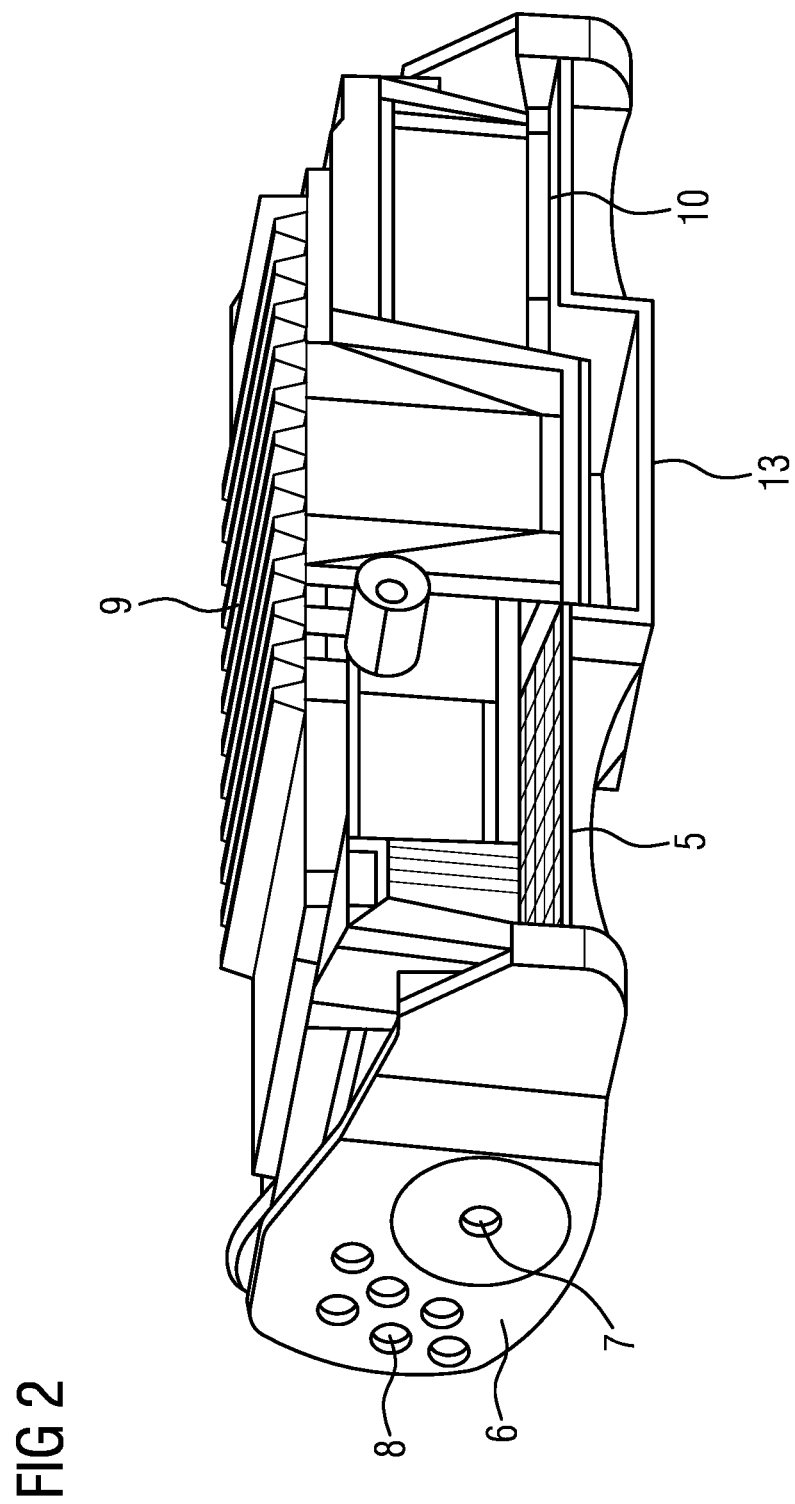
FIG. 2 shows a schematized three-dimensional illustration of a holder for the optical device.
Figure 3:
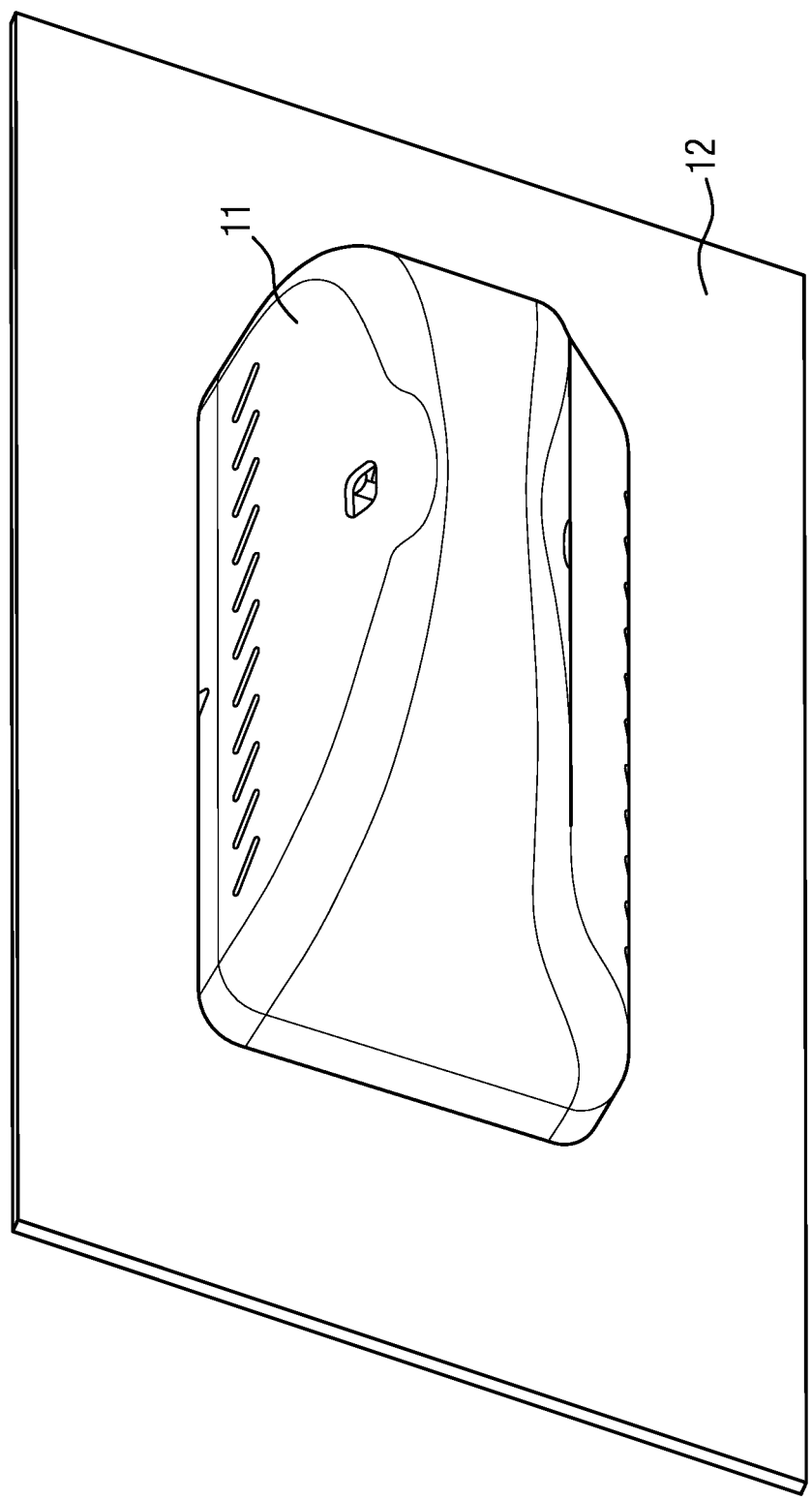
FIG. 3 shows a schematized three-dimensional illustration of a securing device which is mounted on a windshield and which has the bracket and the holder according to FIG. 1 and FIG. 2.

The securing device illustrated and described here for an optical device for attaching same to a windshield of a vehicle has three main parts, namely a bracket 1 illustrated in FIG. 1, a holder 13 illustrated in FIG. 2, and a cover 11 shown in FIG. 3. The holder 13 is fixed here to the bracket 1 and carries an optical device 9, for example a camera, the optical axis of which extends horizontally through an opening 4 provided in the front side 2 of the bracket 1. The cover 11 covers the bracket 1 with installed holder 13 and inserted optical device 9.

For use, the bracket 1 is fastened with its front side 2 to the windshield of a vehicle from the inside. The front side 2 is curved, with the curvature of the front side corresponding to a mean value of the curvatures of standard windshields. Furthermore, the front side 2 is secured on the windshield using a liquid adhesive. Both measures ensure that the bracket 1 can be attached to a multiplicity of windshields that have different curvatures in the vertical and/or horizontal direction.

From the front side 2, two side surfaces 3 extend rearward at an angle of 90° in FIG. 1. These side surfaces 3 each have a pivot point 7 with which the holder 13 illustrated in FIG. 2 can be mounted pivotably on the side surfaces 3 of the bracket 1. By rotation about the respective pivot point 7, the holder 13 can be positioned in such a way that the optical axis of the optical device 9 extends horizontally. In order to fix the corresponding rotational position, the two side flanges 6 of the holder 13 are adjusted with securing pins (not shown) which extend into securing holes on the side flanges 6 of the holder 13. In the present embodiment, the holder 13 has six securing holes which are arranged at intervals of 2° in each case, such that angles which differ by 2° between the holder 13 and the bracket 1 can be set and fixed. The respective pivot points are illustrated at 7 in FIG. 1 and FIG. 2.

When assembling the securing device, the procedure is as follows: the holder 13 is firstly mounted pivotably on the bracket 1 using the pivot points. Thereafter, the holder 13 is fixed in the selected rotational position, in which the optical axis of an optical device 9 assumes a horizontal position. The fixing is undertaken via securing pins that are inserted into a corresponding securing hole 8. This can be carried out, for example, via a screw connection.

The bracket 1 provided with the holder 13 is then attached to the windshield. For this purpose, the front side 2 of the bracket is glued to the inside of the windshield using a liquid adhesive. The optical device 9 is then secured on the holder 13 by mechanically fixing the optical device 9 to the transverse web 5 of the holder 13, for example. Finally, the cover 11 is placed onto and fixed to the bracket with the optical device 9 inserted. Bracket 1 and optical device 9 are then enclosed by the cover 11.

FIG. 3 illustrates the securing device attached to a part of a windshield 12.

The invention claimed is:

1. A device for securing an optical device on a windshield of a vehicle, comprising:
   a box-shaped bracket with a front side which can be glued to the windshield using a liquid adhesive and has an opening for the optical device and which has an average curvature, which results from a measurement of curvatures of standard windshields, and two side surfaces adjoining the front side;
   a holder for the optical device, which the holder can be inserted into the box-shaped bracket and can be fixed there, and which the holder is pivotably mounted on the two side surfaces of the box-shaped bracket and can be fixed in different positions and which the holder is provided with devices for the mounting of the optical device; and
   a cover for the box-shaped bracket with the holder mounted therein together with the optical device.

2. The device as claimed in claim 1, wherein the side surfaces of the box-shaped bracket have a plurality of fixing points for side flanges of the holder for fixing same in various angular positions.

3. The device as claimed in claim 1, wherein the optical device is a camera.

4. A device for securing an optical device on a windshield of a vehicle, comprising:
- a box-shaped bracket with a front side, and an opening for the optical device, wherein the box-shaped bracket has an average curvature, which results from a measurement of curvatures of standard windshields, and two side surfaces adjoined to the front surface;
- a holder for the optical device, wherein the holder is inserted into the box-shaped bracket and is pivotably mounted on the two side surfaces of the box-shaped bracket; and
- a cover, wherein the cover encloses the box-shaped bracket with the holder mounted therein together with the optical device.

5. The device as claimed in claim 4, wherein the optical device is a camera.

6. The device as claimed in claim 4, wherein the box-shaped bracket is attached to the windshield with a liquid adhesive.

7. The device as claimed in claim 4, wherein the side surfaces of the box-shaped bracket have a plurality of fixing points for side flanges of the holder for fixing the holder in various angular positions.

* * * * *